United States Patent [19]

Rotter

[11] 4,228,460
[45] Oct. 14, 1980

[54] METHOD AND APPARATUS FOR COMPENSATION OF TIME BASE ERRORS

[75] Inventor: Gerhard Rotter, Mission Viejo, Calif.

[73] Assignee: BASF Aktiengesellschaft, Ludwigshafen, Fed. Rep. of Germany

[21] Appl. No.: 868,898

[22] Filed: Jan. 12, 1978

[51] Int. Cl.³ .............................................. H04N 5/76
[52] U.S. Cl. .................................. 358/127; 358/177; 358/167; 358/156; 360/36; 360/37
[58] Field of Search ...................... 360/36, 27, 51, 37; 358/127, 8, 156, 155, 167, 177

[56] References Cited

U.S. PATENT DOCUMENTS

| | | | |
|---|---|---|---|
| 3,102,927 | 9/1963 | Dillenburger | 360/37 |
| 3,493,675 | 2/1970 | Iwai | 360/37 |
| 3,748,386 | 7/1973 | Monney | 360/36 |
| 3,959,815 | 5/1976 | Rotter | 360/70 |
| 4,015,076 | 5/1977 | Ishiodort | 358/8 |

Primary Examiner—Bernard Konick
Assistant Examiner—Alan Faber
Attorney, Agent, or Firm—Fulwider, Patton, Rieber, Lee & Utecht

[57] ABSTRACT

Method and apparatus for compensating for variations in the time base of a video signal reproduced in a longitudinal video tape recording system. The signal is passed through a charge-coupled device clocked by a variable rate clock signal to correct for the timing variations. Thereafter, a clamping circuit removes variable voltage offsets introduced by the charge-coupled device, to prevent objectionable horizontal streaking from occurring in the resulting video picture. A clipping circuit removes random noise from the time base pulses of the video signal prior to its passing through the charge-coupled device, whereby the clamping circuit is prevented from creating an objectionable flicker in the resulting video picture.

4 Claims, 2 Drawing Figures

METHOD AND APPARATUS FOR COMPENSATION OF TIME BASE ERRORS

BACKGROUND OF THE INVENTION

This invention relates generally to video tape recording systems and, more particularly, to improvements in methods and apparatus for compensating for time base errors in video signals reproduced in such recording systems.

Standard broadcast format video signals contain time base or horizontal synchronizing pulses occurring at equally-spaced intervals, with video information occurring between the pulses. In color transmission, the video information includes both luminance and chrominance data.

Time base errors in a video signal are variations in the normally precise spacing of the synchronizing pulses. Such errors arise in longitudinal video tape recording systems because the systems generally cannot maintain the speed of the tape sufficiently constant as it is moved past the system's record/playback transducer. These tape speed variations can be due to acoustic vibrations in the tape, variations in the tension of the tape as it moves past the transducer, irregularities in the operation of various tape drive elements and other causes.

Recording systems generally introduce time base variations during both the recording and the reproduction of video signals. The frequency spectrum of the timing variations is generally in the range of 5 Hz. to 3000 Hz. and the amplitude of the timing variations can be as high as ±5 microseconds, depending on the physical characteristics of the particular recording system under consideration.

An example of apparatus used in the past to compensate for the above-described time base error phenomenon is disclosed in U.S. Pat. No. 3,959,815, issued in the name of G. Rotter et al and entitled "Arrangements for Time Base Error Compensation." The apparatus described in that patent includes a feedback loop in which the synchronizing pulses of a video signal produced in a recording system are locked onto a fixed reference frequency corresponding to the average rate of the pulses. The loop utilizes a variable delay line in the form of a "bucket brigade" or a charge-coupled device, in which the frequency of a clock signal controlling the device is continuously varied so as to compensate for the detected errors in timing. This provides a delayed video signal in which the successive synchronizing pulses are substantially evenly spaced.

Unfortunately, such prior art systems have not provided entirely satisfactory performance when typical commercially available charge-coupled devices are used. These devices suffer from the drawback that they introduce voltage offsets into the video output signals, with the magnitude of the offsets varying according to the frequency at which the devices are clocked. The frequency spectrum of the voltage offsets thus corresponds generally to the spectrum of the variable rate clock signal applied to the device. These voltage offsets create objectionable horizontal streaking in the resulting video picture, i.e. adjacent groups of horizontal lines have respectively greater and lesser luminance levels that would otherwise occur.

Prior attempts to remove the aforedescribed streaking in the video picture have included the use of conventional clamping circuits following the charge-coupled devices, to clamp the synchronizing pulses to a fixed reference level. To remove the streaking completely, the clamping circuits must be fast enough to detect and respond to the entire frequency spectrum of the voltage offset variations, i.e. several thousand Hertz. Use of such a fast clamping circuit, however, frequently creates an objectionable flicker in the resultant video picture.

This flicker is a result of random noise, i.e., noise other than the voltage offset variations introduced by the charge-coupled device, superimposed on the synchronizing pulses. Such noise frequently causes the clamping circuit to adjust the video signal to the wrong level, resulting in random variations in the luminance level (i.e. flicker) of the resulting video picture. Flicker has been found to occur even where the signal-to-noise ratio of the video signal exceeds 40 db.

It will be appreciated from the foregoing that there is still a real need for an effective technique for the correction of time base errors in a video signal, that does not introduce objectionable streaking or flicker in the resulting video picture. The present invention fulfills this need.

SUMMARY OF THE INVENTION

Basically, the present invention resides in an improved method and apparatus for compensating for variations in the time base of a video signal. The apparatus includes means for delaying the video signal by a variable amount to compensate for the time base variations, and means for clamping the horizontal synchronizing pulses in the delayed video signal to a fixed reference level. In accordance with the invention, the apparatus is provided with means for removing any random noise that might be superimposed on the synchronizing pulses prior to clamping, whereby such noise does not influence operation of the clamping means.

More specifically, the delay means of the apparatus preferably takes the form of a charge-coupled device (CCD) that is clocked by a variable rate clock signal supplied by a feedback control system. The instantaneous frequency of the clock signal is adjusted automatically by the control system to lock the synchronizing pulses in the video signal output by the CCD to a fixed reference frequency corresponding to the average rate of the pulses.

The means for removing random noise superimposed on the successive time base pulses is provided by a circuit for clipping off a portion of each of the pulses and thereby removing most random noise that might be present in the pulses. Following passage through the CCD to correct for any variations in the timing of the time base pulses, the video signal is passed through the means for clamping the successive noise-free (and now periodic) time base pulses to a fixed reference level.

In summary, then, the clamping means removes any voltage offsets that might be introduced into the video signal by the CCD to thereby prevent streaking from occurring in the resulting video picture, and the clipping circuit removes random noise from the time base pulses of the video signal, to insure that the clamping means is responsive only to voltage offsets caused by the CCD and thereby to prevent flicker from occurring in the resulting video picture.

In accordance with another aspect of the invention, the apparatus includes means for increasing the amplitude of the time base pulses of the video signal prior to recording on the video tape. The clipping circuit then restores the amplitudes of the successive time base pulses to their normal level relative to the information portion of the video signal. This insures that the clipped pulses will be of sufficient magnitude to be detected by equipment (e.g. a video receiver) to which the invention apparatus is connected.

Other aspects and advantages of the present invention will become apparent from the following more detailed description of the preferred embodiment, taken in conjunction with the accompanying drawings, which disclose, by way of example, the principles of the invention.

BRIEF DESCRIPTION OF THE DRAWINGS

In the accompanying drawings.

DESCRIPTION OF THE PREFERRED EMBODIMENT

Figure 1:
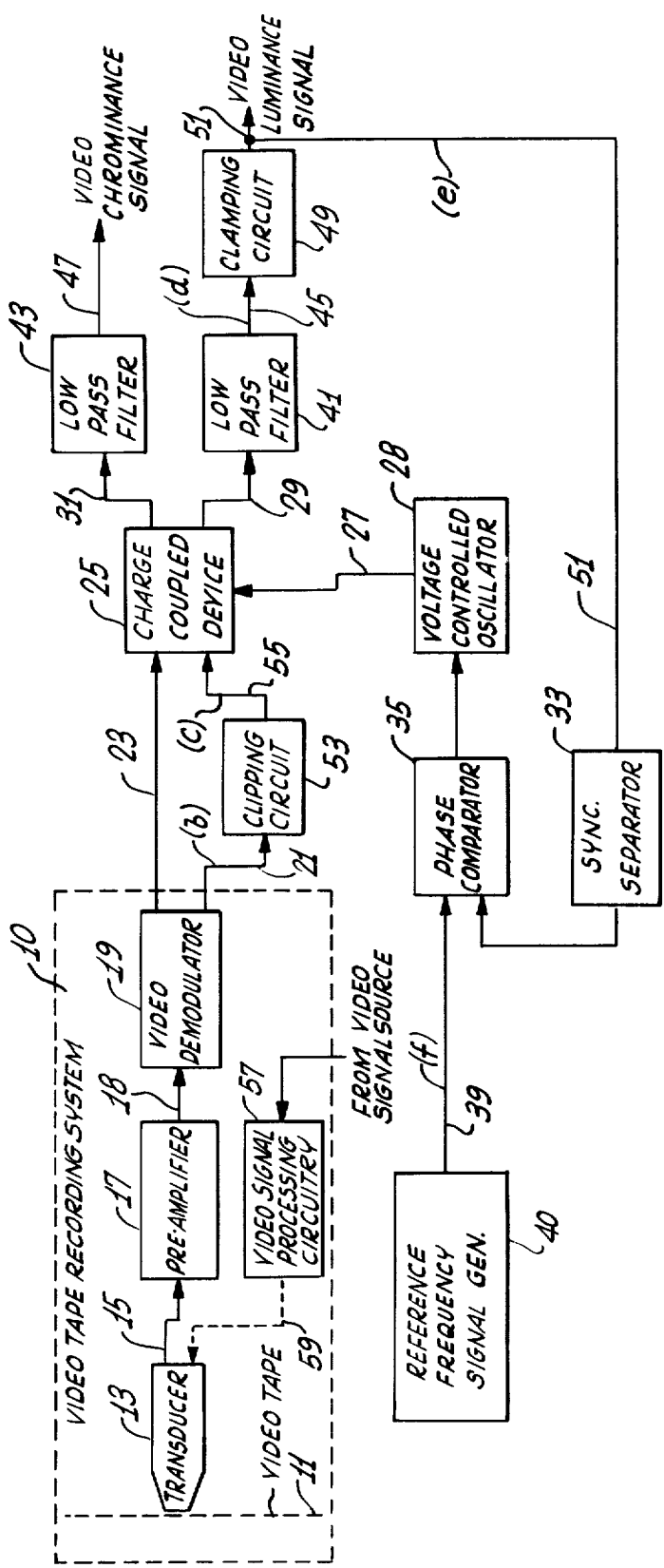
FIG. 1 is a block diagram of a time base error correction system in accordance with the present invention and connected for use with a video tape recording system.

Referring now to the drawings, and particularly to FIG. 1 thereof, there is shown a time base correction apparatus, constructed in accordance with the preferred embodiment of the invention, and connected for use with a longitudinal video tape recording system 10.

The longitudinal video tape recording system 10 includes a video tape 11 and a transducer or magnetic head 13 to generate a composite video signal corresponding to the modulated information recorded on the tape. The composite video signal is transmitted over line 15 to a pre-amplifier 17 and, in turn, over line 18 to a demodulator 19, which separates the luminance information from the chrominance information and outputs a baseband video luminance signal on line 21 and a corresponding amplitude modulated video chrominance signal on line 23. As shown in FIG. 2(b), the video luminance signal on line 21 contains spaced horizontal synchronizing pulses, indicated by reference numeral 24, with video luminance information occurring between them.

The steps of recording and playing back the composite video signal can introduce timing variations into both the luminance signal on line 21 and the chrominance signal on line 23. These timing variations, if uncorrected, result in unequal spacing between the successive horizontal synchronizing pulses contained in the luminance signal, and consequent loss of horizontal synchronization in the reproduced video picture. The unequal time spacing of the pulses 24 in FIG. 2(b) can be observed by comparing their positions on the horizontal time axis to the positions of synchronizing pulses in a corresponding video signal prior to recording, as shown in FIG. 2(a). Equally spaced pairs of vertical reference lines, indicated by reference numeral 24a, are drawn at positions corresponding to the beginning and end of each synchronizing pulse in FIG. 2(a), to emphasize the unequal spacing of the corresponding pulses 24 in FIG. 2(b).

The demodulated luminance and chrominance signals on lines 21 and 23, respectively, are delayed by variable delay means in the form of a charge-coupled device (CCD) 25, the total delay time of which is controlled in such a manner as to compensate for the timing variations. The luminance signal and the chrominance signal are passed simultaneously through separate channels of the CCD 25 and the CCD is clocked by a variable rate clock signal supplied over line 27 from a voltage controlled oscillator 28. The CCD 25 thus generates a delayed luminance signal on line 29 and a delayed chrominance signal on line 31, with the timing of the two delayed signals corresponding to the timing of the video signal prior to recording on the video tape, i.e. with the successive synchronizing pulses being evenly spaced.

The CCD 25 is followed by a pair of low-pass filters 41 and 43 to filter the delayed luminance signal on line 29 and delayed chrominance signal on line 31, respectively, and thereby remove any high frequency switching noise introduced into the signals by the CCD. The filters therefore provide as outputs a filtered luminance signal on line 45 and a video chrominance signal on line 47. As shown in FIG. 2(d), the luminance signal on line 45 contains synchronizing pulses, indicated by the reference numeral 48, which are aligned with the periodic reference lines 24a.

The voltage controlled oscillator 28, which supplies the variable rate clock signal to the CCD 25 over line 27, is a part of a feedback loop that also includes a sync separator circuit 33 and a phase comparator 35. Operation of a similar feedback loop is described in the aforesaid U.S. Pat. No. 3,959,815.

The frequency of the clock signal on line 27 from the oscillator 28 is automatically adjusted by the loop so as to lock the frequency and phase of the synchronizing pulses in the delayed video luminance signal output by the CCD 25 on line 29, onto the frequency and phase of a reference signal supplied over line 39 to the phase comparator 35. For purposes of illustration, the reference frequency signal is shown as being supplied by a reference frequency signal generator 40. As described in the aforesaid patent, an associated servo system (not shown) is used to effect a coarse control of the tape speed, whereby the average rate of the synchronizing pulses in the composite video signal reproduced from the video tape 11 corresponds to the frequency of the reference signal.

The reference signal on line 39 is shown in FIG. 2(f), with its periodic reference pulses being indicated by the reference numeral 42. It will be observed that the synchronizing pulses 48 in the luminance signal on line 45 are shown in FIG. 2(d) as having been controllably delayed by the apparatus to be in alignment with the reference pulses 42.

Typically, charge-coupled devices introduce voltage offsets into the delayed signals, and the offsets vary in magnitude according to the frequency at which the devices are clocked. This poses no special problem for the delayed chrominance signal on line 31, because that signal is frequency modulated and its d.c. level is of no consequence.

On the other hand, the variable voltage offsets do pose a problem for the delayed luminance signal on line 29, since this is a baseband signal in which the d.c. level carries video luminance information. The voltage offsets are not affected by the low-pass filter 41 and can be readily observed in the filtered luminance signal on line 45, shown in FIG. 2(d), in which it will be noted that the successive synchronizing pulses 48 have peak values at different voltage levels.

The variable voltage offsets in the filtered luminance signal on line 45 from the low-pass filter 41 are removed by a clamping circuit 49 that clamps the successive synchronizing pulses to a fixed reference level. Accordingly, the circuit 49 outputs a video luminance signal on line 51, shown in FIG. 2(e), of which the d.c. level has been restored to that of the corresponding luminance signal prior to recording on the tape, as shown in FIG. 2(a). It will be understood by those of ordinary skill in the electronics art that the clamping circuit 49 can be readily constructed using conventional design techniques.

The video luminance signal on line 51 from the clamping circuit and the video chrominance signal on line 47 from the low pass filter 43 form the two video outputs of the time base correction apparatus. These outputs are subsequently processed by conventional techniques and utilized to modulate a carrier signal for transmission to, and reproduction in, a conventional television receiver.

A problem is introduced by the clamping circuit 49 when random noise, introduced from sources other than the CCD 25, is present on the synchronizing pulses. Such noise can cause the clamping circuit to adjust the luminance signal repetitively to the wrong level, thereby creating flicker in the resultant video picture.

In accordance with the invention, the flicker is prevented by removing the random noise from the successive synchronizing pulses of the luminance signal, prior to clamping by the clamping circuit 49. In the preferred embodiment, this is accomplished by a clipping circuit 53 that precedes the CCD 25. The circuit 53 clips off a portion of each synchronizing pulse 24 in the demodulated luminance signal supplied on line 21 and illustrated in FIG. 2(b), to provide a clipped luminance signal on line 55, as illustrated in FIG. 2(c), in which the pulses are substantially noise-free and of a constant and equal level. The clipping circuit does not affect the video luminance information occurring between the successive pulses. It will be understood by those of ordinary skill in the art of electronic design that the clipping circuit 53 can be readily constructed using conventional design techniques.

The clipping circuit 53 does not, of course, prevent the CCD 25 from introducing variable voltage offsets into the synchronizing pulses in the delayed luminance signal on line 29, but it does cause the delayed pulses to be substantially free of noise introduced from other sources. The clamping circuit 49 is then able to clamp the pulses to the desired reference level, without any random variations in level.

The time base correction apparatus of the invention also includes amplifying means for increasing the relative amplitude of the successive synchronizing pulses, prior to the recording of the video signal on the tape 11. This amplifying means is included in conventional video signal processing circuitry 57, which processes and modulates video signals prior to recording. As shown by a broken line 59, the processed and modulated video signals are transmitted, in a record mode of operation, to the transducer 13. In playback mode, the clipping circuit 53 restores the amplitudes of the synchronizing pulses of their normal level relative to the remainder of the luminance signal. This insures that the clipped pulses in the video luminance signal, output by the apparatus on line 51, will be of sufficient magnitude to be detected by a device, such as a television receiver, used with the apparatus of the invention.

Figure 2:
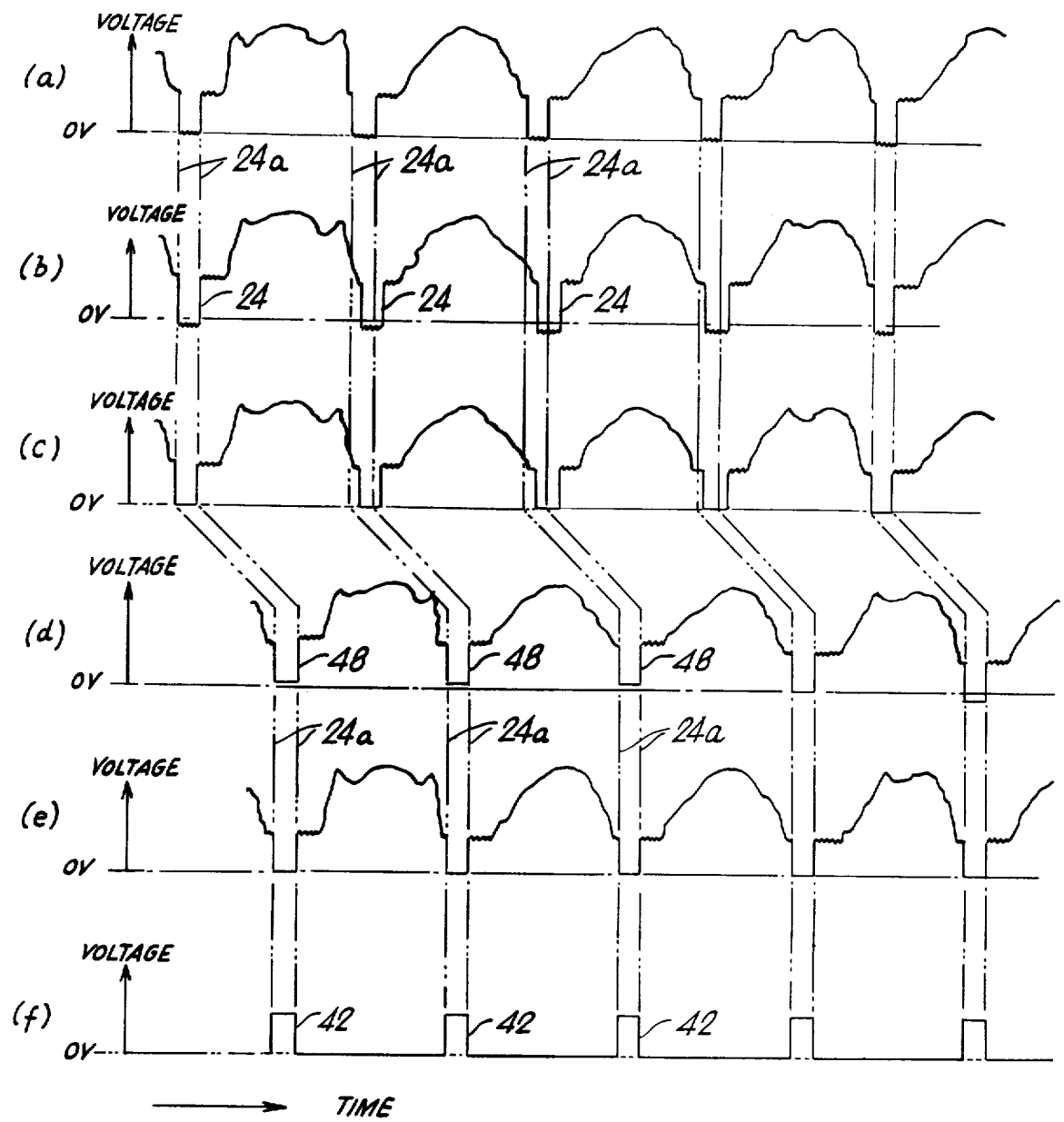
FIGS. 2(a)-2(f) together constitute a timing diagram (not to scale) showing portions of a typical video signal, including both synchronizing pulses and video luminance information, as it would appear at a number of locations in the system of FIG. 1, the diagram showing the progressive steps by which the apparatus corrects for variations in the time base of the video signal.

Referring now more particularly to FIG. 2 of the drawings, FIG. 2(a) depicts a typical composite video signal, including both horizontal synchronizing pulses and video luminance information, prior to its being recorded on the video tape 11. It will be observed that the successive synchronizing pulses are equally spaced and are substantially of equal and constant magnitude.

FIGS. 2(b) through (e) form a graphical depiction (not to scale) of the video signal of FIG. 2(a), including synchronizing pulses and luminance information, as it would appear at various locations in the apparatus of the preferred embodiment. The specific locations in FIG. 1 corresponding to the signals shown in FIGS. 2(b)–2(c) are indicated by reference letters (b) through (e), respectively.

FIG. 2(b) depicts the luminance signal after it has been reproduced from the video tape 11 and demodulated by the demodulator 19. Variations in the timing of the signal of FIG. 2(b) relative to the pre-recorded signal of FIG. 2(a) will be apparent by comparing the synchronizing pulses 24 to the periodic reference lines 24a. It will also be observed that the pulses 24 in the signal of FIG. 2(b) are of an increased magnitude and include superimposed random noise. This noise, if not removed, would frequently cause the subsequent clamping circuit 49 to adjust the luminance signal to the wrong level.

FIG. 2(c) depicts the luminance signal after it has passed through the clipping circuit 53. By comparing this signal to the signal in FIG. 2(b), it will be observed that the clipping circuit has reduced the amplitude of the synchronizing pulses and has removed the random noise which was present. The clipping circuit has otherwise left the luminance signal unaffected.

FIG. 2(d) depicts the luminance signal after it has been delayed by the CCD 25 and filtered by the low-pass filter 41. The time base variations have been removed and the synchronizing pulses are once again evenly spaced. The variable voltage offsets in the signal are readily apparent from the relative levels of the successive pulses 48.

FIG. 2(e) depicts the video luminance signal on line 51 after it has been clamped to a fixed reference voltage level of zero or ground voltage, by the clamping circuit 49. It will be appreciated that the signal is substantially identical to the video signal prior to recording shown in FIG. 2(a).

Finally, FIG. 2(f) is a depiction of the reference frequency signal supplied to the phase comparator 35 on line 39 from the signal generator 40. The apparatus of the present invention is operable to lock the synchronizing pulses of the luminance signal automatically onto the periodic pulses of this reference signal. Alignment of the pulses of the signal of FIG. 2(f) with the synchronizing pulses of the video luminance signal produced by the clamping circuit 49 (i.e. the signal of FIG. 2(e)) will be apparent.

From the foregoing description, it should be apparent that the present invention provides an effective technique for correcting for errors in the time base of a video signal. Moreover, adjustment of the time base is accomplished without introducing either objectionable streaking or objectionable flicker into the resultant video picture.

Although the invention has been described in detail with reference to its presently preferred embodiment, it will be understood by one skilled in the art that various modifications can be made without departing from the spirit and scope of the invention. Accordingly, it is not intended that the invention be limited, except as by the appended claims.

I claim:

1. Time base correction apparatus, for use with a longitudinal video tape recording system that generates a baseband video signal containing both a succession of horizontal synchronizing pulses and video luminance information between the pulses, the spacing between the successive pulses being variable, said apparatus comprising:

a charge-coupled device clocked by a variable rate clock signal to delay the video signal by a variable amount and thereby compensate for the variable spacing between the successive horizontal synchronizing pulses;

filtering means for removing from the delayed video signal high-frequency switching noise introduced by the charge-coupled device;

a clamping circuit for adjusting the levels of the successive horizontal synchronizing pulses of the filtered video signal to a fixed reference level, whereby variable voltage offsets caused by the charge-coupled device are removed; and a clipping circuit for removing a portion of each of the successive horizontal synchronizing pulses of the video signal, including any random noise superimposed thereon, prior to being delayed by the charge-coupled device, whereby the subsequent adjustment by said clamping circuit is not affected by the random noise.

2. Time base correction apparatus as defined in claim 1 wherein the variable rate clock signal is generated by a control system that automatically adjusts the frequency of the clock signal to lock the phase of the successive horizontal synchronizing pulses in the delayed video signal to the phase of a reference pulse signal having a frequency corresponding to the average frequency of the synchronizing pulses in the video signal received from the video tape recording system.

3. Time base correction apparatus, for use with a longitudinal video tape recording system that generates a baseband video signal containing both a succession of horizontal synchronizing pulses and video luminance information between the pulses, the spacing between the successive pulses being variable, said apparatus comprising:

amplification means for increasing the amplitude of the successive horizontal synchronizing pulses of the video signal relative to the luminance information;

a charge-coupled device clocked by a variable rate clock signal to delay the video signal by a variable amount and thereby compensate for the variable spacing between the successive horizontal synchronizing pulses;

filtering means for removing from the delayed video signal high-frequency switching noise introduced by said charge-coupled device;

a clamping circuit for adjusting the levels of the successive horizontal synchronizing pulses of the filtered video signal to a fixed reference level, whereby variable voltage offsets caused by the charge-coupled device are removed; and a clipping circuit for removing a portion of each of the successive horizontal synchronizing pulses of the video signal, including any random noise superimposed theron, prior to being delayed by said charge-coupled device, the magnitude of the portion of each pulse removed corresponding generally to the magnitude of the increase in amplitude produced by said amplification means, said clipping circuit operating to enable said clamping circuit to produce a video signal output that is substantially free of variations in its level that otherwise would have been caused by said clamping circuit because of the presence of random noise superimposed on the successive horizontal synchronization pulses.

4. A method of correcting for time base variations in a video signal, said video signal including both information components and time base pulses, said method comprising the steps of:

increasing the amplitude of the time base pulses relative to the information components of the video signal;

clipping off a portion of each of the successive time base pulses, to remove any random noise superimposed thereon, the decrease in amplitude effected by said step of clipping corresponding generally to the increase in amplitude effected by said step of increasing;

delaying the video signal by a variable amount to correct for the time base variations; and clamping the time base pulses of the video signal to a fixed reference level, to produce a video signal substantially free of variations in its level caused by said step of delaying, and wherein, because of the previous step of clipping, the video signal produced is also substantially free of variations in its level that otherwise would have resulted from clamping a signal containing such noise.

* * * * *